July 8, 1930.                G. ADKINS                1,770,291
DRAFT ATTACHMENT FOR VEHICLES
Filed April 27, 1928      3 Sheets-Sheet 1
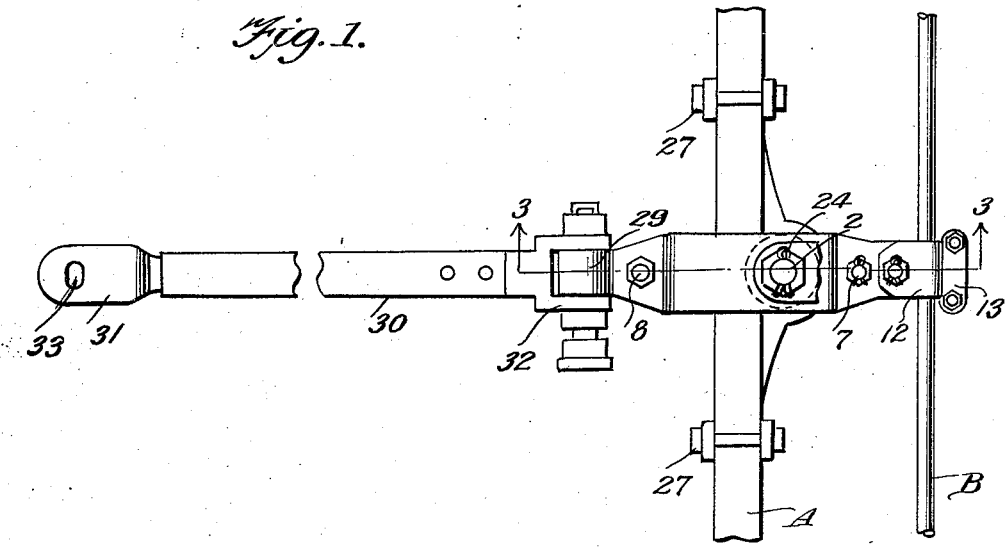
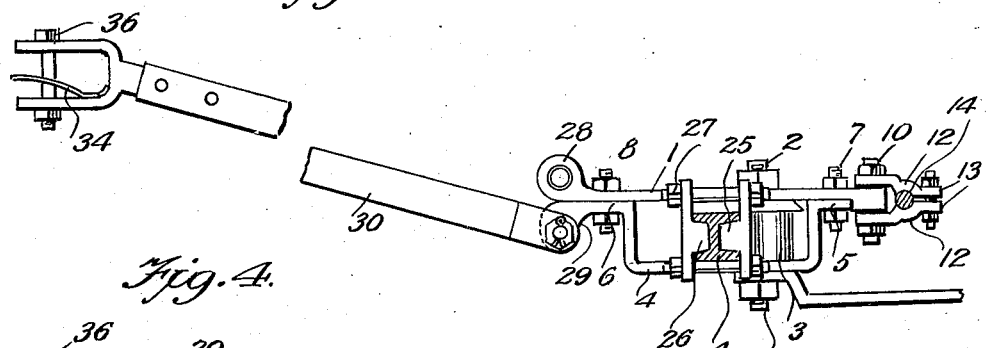
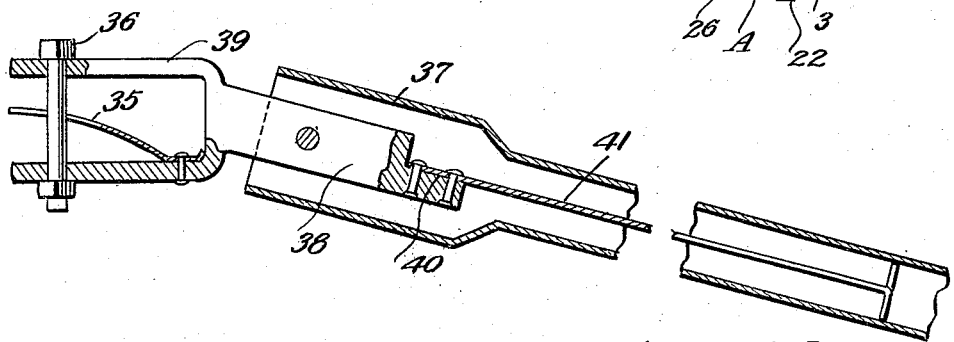
George Adkins INVENTOR
BY Victor J. Evans ATTORNEY July 8, 1930. G. ADKINS 1,770,291
DRAFT ATTACHMENT FOR VEHICLES
Filed April 27, 1928 3 Sheets-Sheet 2
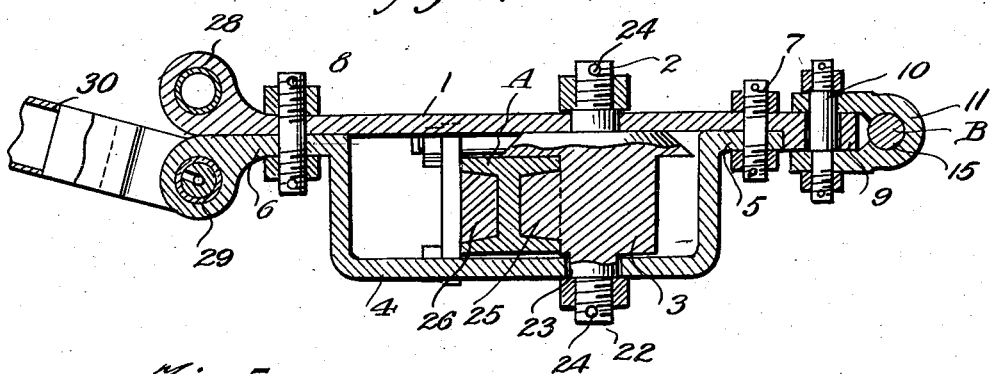
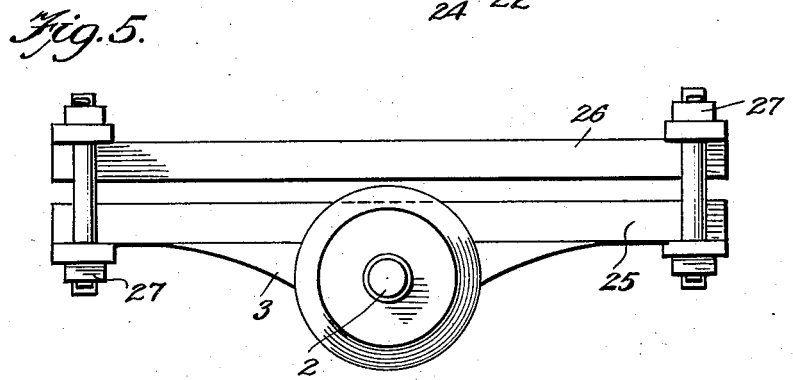
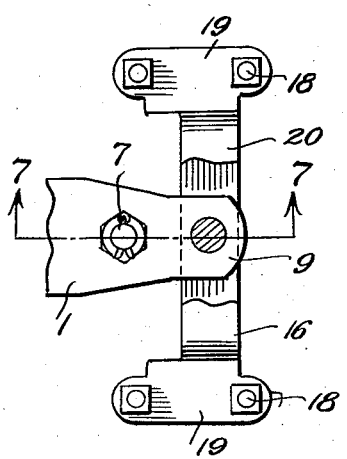
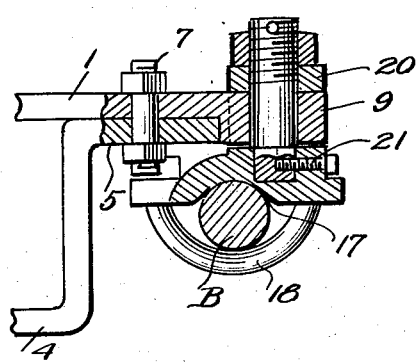
George Adkins
INVENTOR
BY Victor J. Evans
ATTORNEY July 8, 1930.  G. ADKINS  1,770,291
DRAFT ATTACHMENT FOR VEHICLES
Filed April 27, 1928  3 Sheets-Sheet 3
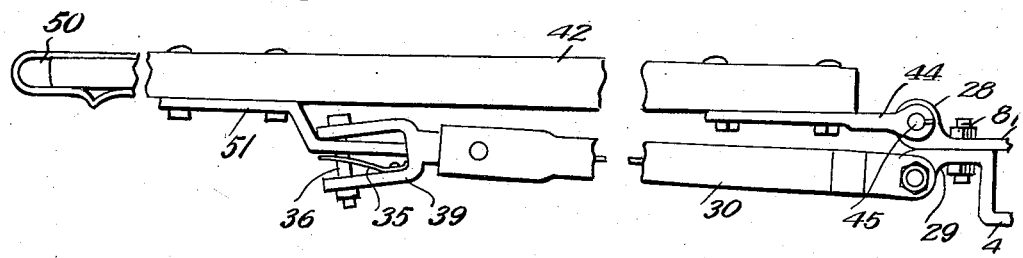
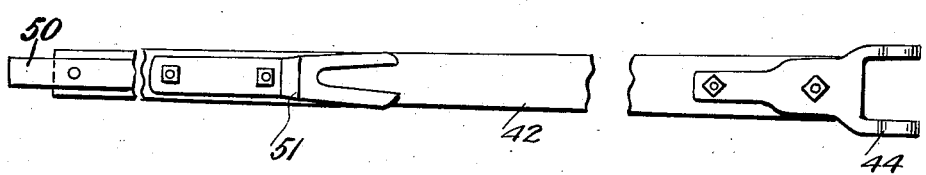
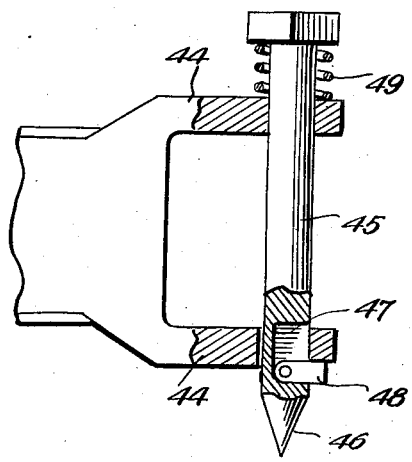
George Adkins
INVENTOR
BY Victor J. Evans
ATTORNEY Patented July 8, 1930

1,770,291

UNITED STATES PATENT OFFICE

GEORGE ADKINS, OF CARNEGIE, OKLAHOMA

DRAFT ATTACHMENT FOR VEHICLES

Application filed April 27, 1928. Serial No. 273,327.

This invention relates to draft attachments for vehicles and its general object is to provide a hitch for trailers and other vehicles to be towed, that can be employed with any pulling means including draft animals.

A further object of the invention is to provide a hitch of the character set forth, that can be easily and expeditiously applied, is strong and sturdy, simple in construction, inexpensive to manufacture, efficient in operation and service and is constructed with a view of reducing rattling and vibration to a minimum.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a top plan view of the hitch constructed in accordance with my present invention and showing the same applied to parts of a vehicle to be towed.

Figure 2 is a side elevation of the device and illustrates a modified form of hitch tongue.

Figure 3 is a sectional view taken approximately on line 3—3 of Figure 1, looking in the direction of the arrows.

Figure 4 is a fragmentary longitudinal sectinal view taken through a further modified form of the hitch tongue, with parts broken away.

Figure 5 is a top plan view of the axle clamp and bearing parts of the hitch.

Figure 6 is a fragmentary top plan view of the modified form of connecting rod clamp.

Figure 7 is a sectional view taken approximately on line 7—7 of Figure 6, looking in the direction of the arrows.

Figure 8 is a fragmentary side elevation showing a team tongue secured to the hitch and illustrating its cooperation with the hitch tongue.

Figure 9 is a bottom plan view of the team tongue.

Figure 10 is a top plan view of the fork for attaching the team tongue to the hitch.

Referring to the drawings in detail, the letter A indicates the front axle of a vehicle to be towed and B the connecting rod of the steering mechanism thereof.

The axle bearing clamp includes an upper plate 1 provided with a relatively large opening disposed slightly beyond its center for the purpose of receiving the upper stud 2 which rises from the bearing block 3.

The lower plate which is indicated by the reference numeral 4 is substantially U-shape, as best shown in Figure 3. The arms of the U-shaped lower plate 4 are bent at right angles to provide flanges 5 and 6, and the flange 5 is apertured for the purpose of receiving a bolt and nut connection 7 for securing this end of the lower plate to the upper plate, while the flange 6 is likewise provided with an aperture for receiving a bolt and nut connection 8 for securing the plates together at their forward end, the upper plate being provided with apertures for accommodating bolt and nut connections as shown.

The rear end of the upper plate is slightly enlarged as at 9 and this enlargement is formed with an aperture to accommodate a bolt 10 for securing a connecting rod clamp 11 thereto. The connecting rod clamp in the form as shown in Figures 1 and 2 is made up of a pair of like members indicated by the reference numeral 12 and these members terminate at their free ends in elongated tongues 13 which receive bolt and nut connections as shown for disposing the members in clamping engagement with the connecting rod as best shown in Figure 1, the connecting rod being received in the substantially semi-circular confronting faces of the members and these faces which are indicated by the reference numeral 14 are shown in Figure 2.

In the form of connecting rod clamp as shown in Figure 3, it will be noted that the clamp is constructed in a single piece and is provided with a circular bore 15 to accommodate the connecting rod.

A further modified form of connecting rod clamp is illustrated in Figures 6 and 7 and this form includes a plate 16 bent longitudinally upon itself to form a recess 17 for receiving the connecting rod which is held in the recess through the medium of U-bolts 18. The U-bolts have their ends passing through the end portions 19 of the plate which is provided with a raised portion 20 intermediate its ends for forming an elongated opening which receives the enlarged end 9 of the upper plate 1 as best shown in Figure 7.

The bolt for securing the enlarged end 9 in the opening formed by the raised portion 20 has a reduced lower threaded end which is provided with a threaded bore to accommodate a screw 21 and by this construction, it will be apparent that casual movement of the bolt will be prevented, as the screw 21 passes through a portion of the plate as shown.

The lower plate 4 has its bight portion arranged in spaced relation with respect to the upper plate 1 and disposed in this space is the bearing block 3 which is also formed with a lower stud 22 passing through an aperture 23 formed in the bight portion as best shown in Figure 3. Each of the studs 2 and 23 are threaded for a portion of their length for receiving nuts and these nuts are not only threadedly secured on the threaded portion but are held against movement by cotter pins 24. The remaining portion of the studs act as bearings for the plates and the upper and lower surface of the bearing block also accommodate the plates for movement thereon in a horizontal plane as will be apparent. The bearing block is provided with a circular top portion and has formed therewith a bar 25 which cooperates with a bar 26 for securing the bearing block to the axle A through the instrumentality of bolt and nut connections 27. These bars are formed with reduced upper and lower surfaces so as to snugly fit between the flanged portions of the axle as clearly shown in Figure 3.

The forward ends of the respective plates 2 and 4 terminate in bearing eyes 28 and 29 which have disposed therein bushings for a purpose which will be presently apparent.

Secured to the bearing eye 29 is one end of a hitch tongue 30 which includes a hollow intermediate portion and forked ends 31 and 32. The forked end 31 is provided with elongated registering openings 33 so as to allow for slight lateral movement of the tongue.

A spring finger of the type as indicated by the reference numeral 34 may be secured in the forked end 31 of the hitch tongue, and this spring finger is provided with a slot 35 to allow for the passage of the clevis bolt 36.

In Figure 4 I have illustrated a slightly modified form of hitch tongue and in this form, it will be noted that while the intermediate portion of the tongue is hollow, its outer end is enlarged as at 37 and pivotally secured in this enlarged end is the shank 38 of a fork 39. The shank 38 has its inner end reduced to provide a recess 40 and secured in this recess is one end of a spring strip 41 which has its free end split with the portions formed by the split disposed in opposed relation and arranged in contacting engagement with the inner wall of the tongue as shown.

By this construction, it will be obvious that the spring strip acts as a shock absorber and has a tendency to retain the fork 39 in the position as shown so as to prevent the shank from engaging the walls of the enlarged portion and thereby eliminate rattling of the parts.

The hitch tongue is primarily designed to be secured to a towing vehicle or any propelling device, but in the event it is necessary to utilize draft animals for towing a vehicle with my hitch, as above described, I have provided a team tongue which is indicated by the reference numeral 42.

The team tongue is secured to the bearing eye 28 through the medium of a fork 44 and a clevis pin 45 which is passed through the arms of the fork 44 and the bushing of the eye. The pin is provided with a head and has formed adjacent its pointed end 46 a recess 47 for the purpose of pivotally receiving a keeper 48. The pin is likewise provided with a coil spring 49 which surrounds the same and is adapted for the purpose of urging the pin in one direction and the keeper in engagement with one of the arms of the fork when said keeper is disposed in operative position as shown.

The outer end of the team tongue is provided with a neck yoke connector 50 and secured to the underside of the team tongue adjacent its outer end is a substantially Z-shaped bracket 51 having its free end disposed in spaced relation with respect to the team tongue and slotted to accommodate the clevis bolt of the hitch tongue as shown in Figure 8.

From the above description and disclosure of the drawings, it will be obvious that I have provided a hitch that can be easily and expeditiously secured to a vehicle to be towed as well as to any towing means including draft animals, and the bearing block can be firmly fixed to the axle of the vehicle to be towed while the upper and lower plates 1 and 4 can be securely connected to the steering rod and by this construction, it will be apparent that the towed vehicle will be guided in accordance with the direction of travel of the means towing the same.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A hitch of the character described comprising a bearing block, means for securing said bearing block to the front axle of a vehicle to be towed, studs extending from the upper and lower surface of said bearing block, a plate carried by the upper stud and mounted for movement in a horizontal plane on the upper surface of said bearing block, a bearing eye formed with one end of said plate, an enlarged apertured end formed with the opposite end of said plate, a connecting rod clamping means secured to said enlarged apertured end, a substantially U-shaped plate secured to the plate first mentioned and being mounted for movement on the lower surface of said bearing block, said U-shaped plate being provided with an aperture for receiving the lower stud, means for securing the plates in operative position and carried by said studs, a bearing eye formed with the U-shaped plate and tongues adapted to be pivotally secured in said bearing eye.

2. In a hitch a bearing block, a pair of cooperating plates pivotally mounted on said bearing block, a connecting rod clamp secured to one of said plates, a tongue secured to the other of said plates, a forked outer end for said tongue and being provided with elongated registering openings formed in the arms thereof, a spring finger secured to one arm and rising at an inclination therefrom, and said spring finger having a slot formed thereing to register with the openings of the arms.

3. In a hitch including plates having connection with the axle of a vehicle and the connecting rod of the steering mechanism thereof, a team tongue pivotally secured to one of the plates, a fork secured to one end of said team tongue, a pin adapted to be arranged in registering openings formed in the arms of said fork, a keeper for said pin, resilient means carried by said tongue and cooperating with said keeper for retaining the pin in operative position, a hitch tongue pivotally secured to the other of said plates and means for connecting said hitch tongue to said team tongue.

4. In a hitch, a bearing block, a pair of cooperating plates pivotally mounted on said bearing block, a connecting rod clamp secured to one of said plates, a tongue secured to the other of said plates and including a hollow portion, a forked outer end for said tongue and being provided with elongated registering openings formed in the arms thereof, said forked outer end being pivoted, a spring strip having one end fixed to the forked outer end and its opposite end split with the portions formed by the split disposed in opposed relation and arranged in contacting engagement with the inner wall of the tongue, and spring means secured to one arm and having a slot registering with the openings of the arms.

In testimony whereof I affix my signature.

GEORGE ADKINS.